(12) United States Patent
Repphun et al.

(10) Patent No.: US 7,362,540 B2
(45) Date of Patent: Apr. 22, 2008

(54) PRESSURE CONTROL SYSTEM FOR SEALED ENCLOSURES

(75) Inventors: William F. Repphun, Boulder, CO (US); James H. Smith, Woodside, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 458 days.

(21) Appl. No.: 11/053,826

(22) Filed: Feb. 9, 2005

(65) Prior Publication Data
US 2005/0219740 A1    Oct. 6, 2005

Related U.S. Application Data

(60) Provisional application No. 60/558,344, filed on Mar. 31, 2004.

(51) Int. Cl.
*G11B 33/14*    (2006.01)
(52) U.S. Cl. .................................... 360/97.02
(58) Field of Classification Search ... 360/97.01–97.04
See application file for complete search history.

(56) References Cited

U.S. PATENT DOCUMENTS

| | | | |
|---|---|---|---|
| 4,863,499 A | 9/1989 | Osendorf | |
| 5,229,899 A | 7/1993 | Brown | |
| 5,307,222 A | 4/1994 | Dion | |
| 5,392,177 A | 2/1995 | Chainer | |
| 5,546,250 A | 8/1996 | Diel | |
| 6,042,960 A | 3/2000 | DaCosta | |
| 6,065,354 A | 5/2000 | Dinsmore | |
| 6,324,860 B1 | 12/2001 | Maeda | |
| 6,396,400 B1 | 5/2002 | Epstein | |
| 6,453,679 B1 | 9/2002 | Aoyagi | |
| 6,519,110 B2 | 2/2003 | Dague | |
| 6,633,529 B1 | 10/2003 | Yamada | |
| 6,654,201 B2 | 11/2003 | Smith | |
| 7,004,575 B2 * | 2/2006 | Inoue et al. | 347/86 |
| 7,218,473 B2 * | 5/2007 | Bernett et al. | 360/97.02 |

OTHER PUBLICATIONS

"Pli-Valv® Pressure Relief Valve", printed Apr. 28, 2004 (2 pages).
About Plitek, printed Apr. 28, 2004 (2 pages).
STL 11844, Beatty et al., U.S. Application entitled, Relief Valve For A Data Storage Device, no date.

* cited by examiner

*Primary Examiner*—Allen Cao
(74) *Attorney, Agent, or Firm*—Shumaker & Sieffert, P.A.

(57) ABSTRACT

A pressure control system for a sealed enclosure may include opposing one-way valves to limit the differential pressure between the atmospheres internal and external to the sealed enclosure. The pressure control system may allow the internal atmosphere to vent out of a first one-way valve if the internal pressure exceeds the external pressure by a first predetermined pressure. The pressure control system may allow the external atmosphere to be drawn in through a second one-way valve if the external pressure exceeds the internal pressure by a second predetermined pressure. By allowing the exchange of gasses only when the differential pressure falls outside of a predetermined range, overall contamination may be reduced. By reducing the ingress of contaminants, such as dust, water, smog, and outgassed substances, performance may be improved and service life of components housed within the sealed enclosure may be extended.

29 Claims, 5 Drawing Sheets

PRESSURE CONTROL SYSTEM FOR SEALED ENCLOSURES

CLAIM OF PRIORITY

This application claims priority under 35 U.S.C. § 119(e) to U.S. patent application Ser. No. 60/558,344, filed on Mar. 31, 2004, the entire contents of which are hereby incorporated by reference.

TECHNICAL FIELD

This invention relates to controlling differential pressure in sealed enclosures.

BACKGROUND

Some electrically operated devices, such as data storage devices, are housed in protective enclosures. Some enclosures, also referred to as housings, may be sealed. One reason that an enclosure may be sealed is to keep out contaminants, such as water vapor, smog, dust, and various other substances. Such contaminants, if allowed into the enclosure, may cause malfunctions of electronic, electromechanical, and mechanical components housed within the enclosure. Over time, such contaminants may cause corrosion, interfere with moving parts, degrade performance of lubricants, and otherwise generally degrade the performance of sensitive components. Accordingly, sealed enclosures may extend the service life and maintain the performance of the components that they house.

In general, a substantially sealed enclosure may inhibit the exchange of gasses into or out of the enclosure. Large differential pressures may deform the walls of some sealed enclosures. However, a small deformation in the enclosure wall of a sealed hard disk drive (HDD) enclosure, for example, could lead to catastrophic failure (e.g. head disk crash and permanent data loss). Enclosure wall deformation may occur, for example, due to internal heating of gasses within the enclosure that results from the operation of certain heat-dissipative components. In another example, enclosure wall deformation may result from altitude-related pressure changes experienced during shipment or transport by airplane. During ascent, external pressure decreases tend to expand the enclosure walls. Conversely, during descent, external pressure increases tend to crush the enclosure walls.

Various approaches may be used to address the differential pressure problem. One approach is to make the enclosure walls strong enough to withstand peak differential pressures. However, using stronger materials may involve increasing wall thickness or using stronger materials. Increasing wall thickness may add significantly to the weight of the enclosure, and may also make it more difficult to meet industry-standard, low-profile form factors. In addition, using a stronger material may significantly increase the cost of the enclosure.

An alternate approach that may be used to address the differential pressure problem is to incorporate a breather port. A breather port may be an aperture in the enclosure to allow the internal and external pressures to equalize. By allowing pressure to equalize, the enclosure may not need to be designed to withstand significant differential pressures. As such, thin, inexpensive, and lightweight materials, such as thin aluminum stock, may be used for some enclosures.

However, a breather port may also allow external ambient gasses, and any contaminants they carry, to be drawn into the sealed enclosure in an uncontrolled manner. In a data storage device, for example, such contamination may contribute to data errors in the read/write operations, corrode components, degrade lubricants, and otherwise generally reduce the service life of the device.

SUMMARY

A pressure control system for a sealed enclosure may include opposing one-way valves to limit the differential pressure between the atmospheres internal and external to the sealed enclosure. The pressure control system may allow the internal atmosphere to vent out of a first one-way valve if the internal pressure exceeds the external pressure by a first predetermined pressure. The pressure control system may allow the external atmosphere to be drawn in through a second one-way valve if the external pressure exceeds the internal pressure by a second predetermined pressure. By allowing the exchange of gasses only when the differential pressure falls outside of a predetermined range, overall contamination may be reduced. By reducing the ingress of contaminants, such as dust, water, smog, and outgassed substances, performance may be improved and service life of components housed within the sealed enclosure may be extended.

Although some exemplary applications described herein relate to enclosures for data storage devices, these examples are intended to be merely illustrative and not limiting. Certain embodiments of the pressure control system and methods may apply to other electronic, mechanical, or electromechanical applications that may be housed in a sealed enclosure to reduce contamination. This is particularly true where differential pressure between the interior and exterior of the sealed enclosure may rise to levels sufficient to stress the enclosure.

One aspect generally includes opposing one-way valves in a cover plate assembly that may be sealably attached to a suitable enclosure. Another aspect generally includes opposing one-way valves in an enclosure. Yet another aspect generally includes a method of using opposing one-way valves to control differential pressure between an exterior region and an interior region of a sealed enclosure.

In various embodiments, the foregoing aspects may include certain features. For example, the one-way valves may feature a low profile as described herein. The valves may be bonded, as appropriate, to an exterior or interior surface to sealably encompass apertures.

Other embodiments may feature a filter, such as an adsorbent module. The filter may include various elements, such as carbon, activated carbon, silica gel, molecular sieves, and carbonates (e.g., potassium carbonate). Some embodiments may also include an adsorbent breather filter that encompasses one of the apertures in the enclosure.

Still other embodiments may be incorporated into a processor-based system such as a server or a data storage device, for example.

Still other embodiments may include a housing that defines a cavity that contains the enclosure with the pressure control system. The housing may include shock-absorbing elements within the cavity and between the enclosure and the housing.

These or other embodiments may provide one or more of the following advantages. For example, by reducing the opportunities for contamination to periods of high differential pressure, some enclosures may experience reduced intake of contaminants. Reduced intake of contaminants may lead to improved performance and improved design margins. Moreover, reduced contamination may also lead to increased service life. By reducing the peak differential pressure load borne by a sealed enclosure, the enclosure may be reduced in size, weight, profile, cost, or any combination thereof. When used in combination with environmental control elements within an enclosure, embodiments may further reduce contamination and extend service life. Certain embodiments may also provide a cover plate assembly with opposing breather valves that may be applied as an add-on element to certain enclosure designs, including pre-existing enclosure designs, to reduce contamination. The breather valves may be very low profile, and may further be located optimally to control where the sealed enclosure may breathe. Other features, objects, and advantages will be apparent from the description and drawings, and from the claims.

The details of one or more embodiments are set forth in the accompanying drawings and the description below.

DESCRIPTION OF DRAWINGS

Like reference symbols in the various drawings indicate like elements.

DETAILED DESCRIPTION

Figure 1:
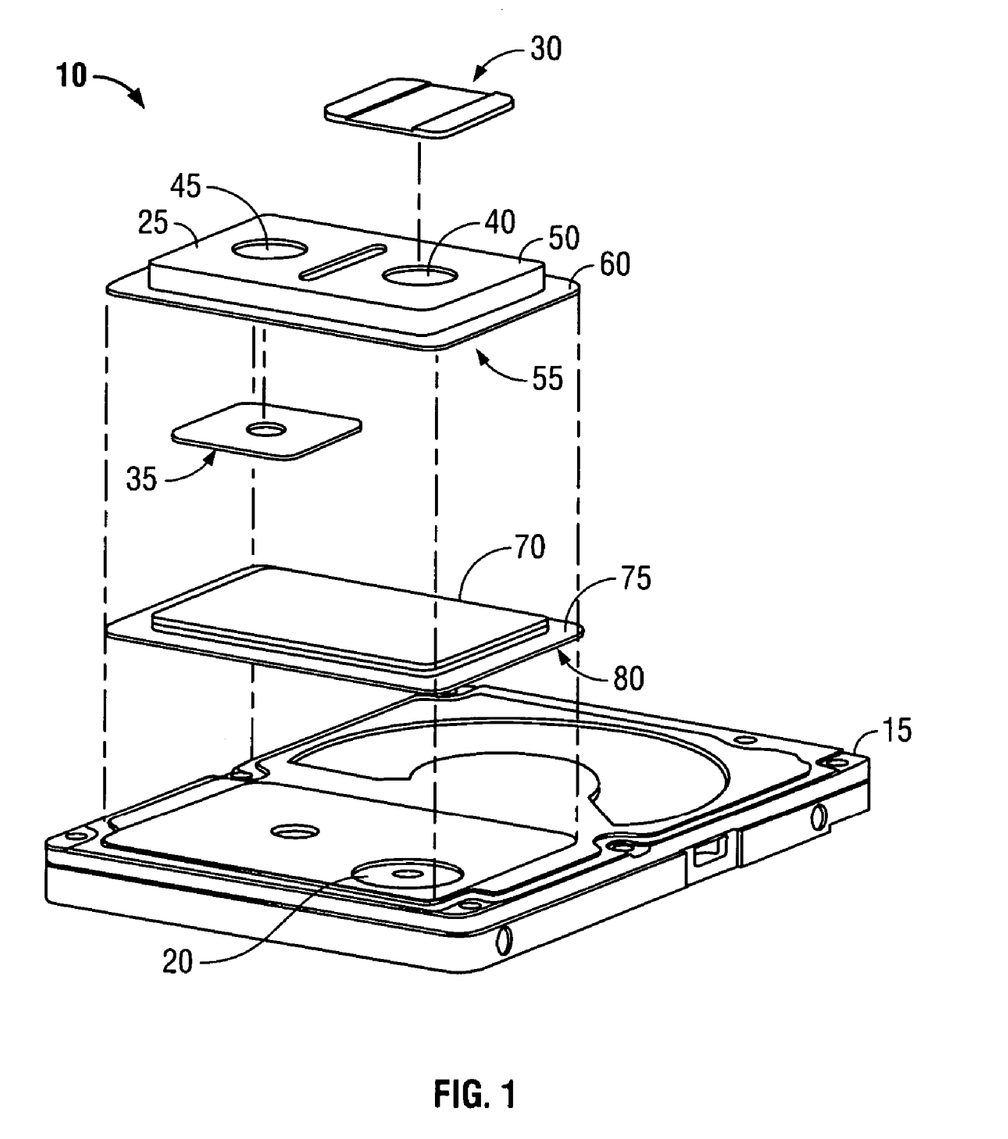
FIG. 1 is an exploded view of an embodiment of a pressure control system assembly and an exemplary sealed enclosure for a hard disk drive (HDD).

FIG. 1 illustrates an exemplary a pressure control system. In this example, the pressure control system includes a cover plate assembly 10 for assembly with an enclosure 15. The enclosure 15 has a breather port 20 that is encompassed by a cover plate 25 when the cover plate is mounted to the enclosure 15. The cover plate assembly 10 includes an outer breather valve 30 that mounts to the exterior surface of the cover plate 25, and an inner breather valve 35 that mounts to an interior surface of the cover plate 25. The cover plate 25 includes two apertures 40, 45 around which the breather valves 30, 35 are installed. When installed, the breather valves 30, 35 may sealably encompass the apertures 40, 45.

In one embodiment, the breather valves 30, 35 are opposing one way valves. As such, when the differential pressure (defined herein as the external pressure minus the internal pressure) is sufficiently positive such that the external atmospheric pressure exceeds the internal pressure by predetermined threshold, valve 35 will allow external atmospheric gasses to be drawn in through the aperture 45. Similarly, when the differential pressure is sufficiently negative such that the internal pressure exceeds the external atmospheric pressure by a predetermined threshold, the valve 30 will allow internal gasses to vent out of the enclosure through the aperture 40.

The cover plate 25 defines an exterior surface 50 and an opposing interior surface 55. In this example, the cover plate includes a flange 60 around the peripheral edge of the cover plate 25 to provide a sealable mating surface for attaching the cover plate 25 to the enclosure 15. In other examples, the cover plate 25 may attach to the enclosure 15 by means other than the flange 60. For example, the cover plate may sealably attach to the enclosure using a butt joint, snap fits, or tongue-in-groove joints, for example, and may further incorporate gaskets, adhesives, fillers, welded joints, or use other appropriate methods and features.

When the cover plate 25 is assembled with the breather valves 30, 35, into a cover plate assembly 10, the cover plate assembly 10 may be used to provide a pressure control system. In one example, this pressure control system may be sealably attached to a sealed enclosure such as the sealed enclosure 15 with the breather port 20. Although the cover plate assembly 10 sealably encompasses the port 20, the cover plate assembly 10 may be configured to limit the differential pressure between the interior and exterior of the enclosure 15 to within the design limits of the enclosure.

For example, a hermetically sealed enclosure may experience significant variations in differential pressure when transported in an airplane. During some flights, the volume of air in the cabin may vary by 20% or more. Specifically, during ascent, the pressure external to the sealed enclosure 15 typically decreases while the pressure inside the sealed enclosure 15 may remain constant. Accordingly, a differential pressure may arise that is potentially significant enough to damage the enclosure 15 and its contents, such as various mechanical and electronic components. During the descent portion of the flight, the ambient external pressure may increase. In that case, a differential pressure may develop such that the enclosure 15 could experience potentially destructive crush forces. Accordingly, some sealed enclosures 15 may not be able to withstand the differential pressures that may arise, for example, during shipment.

The cover plate assembly 10 is configured to automatically limit differential pressure in circumstances in which the differential pressure may fall outside a predetermined range of pressures. The operational thresholds of the opposing one-way valves 30, 35 define the limits of the predetermined range. Valve 35 opens when the differential pressure exceeds a positive predetermined pressure limit, while valve 30 opens when the differential pressure exceeds a negative predetermined pressure limit. In some examples, a positive or a negative predetermined pressure limit for one of the valves may be about 0.1375 psig (9.5 millibars), or it may be about 0.6 psig. In various applications, the predetermined pressure limit for one of the valves may be at a value between about 0.1 psig and about 1.5 psig. In various embodiments, the positive and negative pressure limits may be substantially equal, or they may be substantially different.

In some examples, the predetermined threshold of any particular breather valve may represent a minimum pressure required to operate a properly functioning valve. For example, if a breather valve has a manufacturer-specified 20% tolerance on the operating threshold, that particular breather valve may be expected to open when the differential pressure falls within a range corresponding to the 20% tolerance specification.

When one of the breather valves 30, 35 opens, the internal and external atmospheric pressures tend to equalize. However, in some embodiments, the pressure equalization may not reduce the differential pressure to zero. For example, the valve 35 may open to allow the positive differential pressure to drop to less than 50% of the predetermined threshold of the valve 35. In another example, the valve 30 may open to allow the negative differential pressure to drop to less than 5% of the predetermined threshold of the valve 30. In a further example, either valve may re-close when the appropriate differential pressure across it drops to less than about 0.0375 psig (2.6 millibars). Unless otherwise indicated, these examples illustrate operation of a pressure control system that may be referred to herein as limiting, controlling, or equalizing the differential pressure for a sealed enclosure.

When the differential pressure is within the predetermined range, the cover plate assembly 10 substantially inhibits the flow of gasses and/or other substances through apertures 40, 45. As such, breathing of the enclosure 15 through valves 30, 35 may be substantially limited to periods when pressure equalization is necessary to maintain the structural integrity of the enclosure 15. This is advantageous, in some embodiments, because minimizing the exchange of atmospheric gasses and other potential contaminants may result in extended service life of the apparatus housed in the sealed enclosure.

Breather valves 30, 35 may be made of any suitable one-way pressure relief valve. Embodiments may include a one-way pressure relief valve that uses a flapper valve of the type that may be found in some air compressors. Such a flapper valve may be made, for example, of a flexible spring steel material. Other embodiments may include a one-way pressure relief valve that uses a plunger valve with an axial spring.

Still other embodiments may include a low profile one-way pressure relief valve of the type that is commercially available from Plitek LLC of Des Plaines, Ill. (available under the trade name Pli-Valv® Pressure Relief Valve). In one example, this type of valve includes two substrate layers. Each substrate layer is made, for example, of aluminized Mylar®. In one version, each substrate layer may be approximately 2 cm$^2$ in area. One of the substrate layer sheets on the inlet side of the valve includes an aperture. Disposed substantially between the two substrate layers may be a liquid material that provides surface tension between the substrate layers. This liquid surface tension provides an adhesive force that holds the substrate layers together under low differential pressure conditions. However, when the differential pressure exceeds a threshold for the valve, the pressure may overcome the surface tension, which causes the substrate layers to partially separate, and which in turn allows gasses to pass from the aperture of the valve through the separation between the substrate layers, and out through the outlet side of the valve. In some examples, the valve may open when the differential pressure exceeds a value between 1 and 4 inches of water. In other examples, the valve may open when the differential pressure exceeds about 0.8 inches of water.

The liquid material in the above-described low-profile breather valve may comprise, for example, silicone, fluorocarbons, hydrocarbons, diester, or other types of organic compounds. In one embodiment, the liquid may comprise a perfluoropolyether that has a low vapor pressure. For example, in one embodiment, the liquid material may comprise a compound having the chemical formula: $CF_3$—O—$(CF_2$—O$)_m$—$(C_2F_4$—O$)_n$—$CF_3$.

As discussed above, the breather valves 30, 35 may operate as one-way pressure-relief valves that open in response to a differential pressure in excess of a predetermined threshold across the valve. The threshold may depend, for example, on the area and thickness of the substrate layers. Valves similar to those discussed above are commonly used in applications such as bags for containing coffee beans. However, coffee bags generally have only a single one-way valve to vent internal gasses when pressure within the sealed bag rises to above a predetermined threshold of the valve. In the cover plate assembly 10, the opposing one-way valves 30, 35 provide both for venting internal pressure out of the enclosure and drawing external atmospheric gasses into the enclosure.

In addition to controlling the flow of substances through an aperture in an enclosure using opposing one-way valves as have been described, some embodiments may also filter the flow with environmental control elements. Such filtering may involve controlling atmospheric variables such as humidity, organic contaminants, acidic contaminants, and other air pollutants. Humidity may appear in the form of water vapor in the air. Organic contaminants may be outgassed by sources such as plastics and printed circuit boards near the enclosure 15. Acidic contaminants may come from sources such as smog that may be in the ambient atmosphere around the enclosure 15. Each of these types of contaminants, as well as other known contaminants, may reduce the useful service life of electrical, electronic, and electromechanical devices. For example, a hard disk drive may experience corrosion and a reduction in service life if the disk assembly is exposed to, for example, a high relative humidity.

Some applications may use an adsorbent material to mitigate these effects. For example, a filter containing adsorbent materials may be used to filter gasses exchanged through a breather port. Adsorbent materials may include, either alone or in combination, carbon, activated carbon, silica gel, molecular sieves, or other effective adsorbent materials. In some examples, activated carbon may be combined with a small amount of some carbonates, such as potassium carbonate.

However, adsorbent breather filters may have limited filtering capability. A particular adsorbent filter has the capacity to remove, for example, a limited amount of contaminants from atmospheric gasses. In general, the effective service life of an adsorbent filter may be extended by reducing the amount of contamination to which the adsorbent is exposed. One approach to reducing this amount of contamination is to inhibit substantially all gaseous exchange during periods in which the differential pressure is within a normal, predetermined range. This approach is one example of the use of a pressure control system that uses breather valves 30, 35.

Embodiments of the pressure control system may include environmental controls, such as adsorbent filters, in combination with the breather valves 30, 35. Such embodiments may provide advantages over systems that do not include this combination. For example, the breather valves 30, 35 may maintain an effective seal for normal variations in barometric pressure, but allow the enclosure to breathe if differential pressures build up to levels that could cause the walls of the enclosure 15 to expand or contract. In typical applications and under typical atmospheric conditions, the breather valves inhibit substantially all gaseous exchange most of the time. As such, the amount of contaminants that pass through the filter may be significantly reduced by the breather valves 30, 35. Accordingly, a pressure control system that combines environmental controls with the breather valves 30, 35 may improve service life of the environmental controls, and in turn improve the performance of the pressure control system.

As shown in the embodiment of FIG. 1, the cover plate assembly 10 may be used in combination with an adsorbent 70. In this embodiment, the adsorbent 70 is disposed on sheet of a substrate such as mylar, for example. The sheet has an upper surface 75 and a lower surface 80. The sheet may be at least partially coated with adhesives on one or both of its major surfaces. For example, the upper surface 75 may be coated with an adhesive material for being adhesively bonded to the interior surface of the flange 60 on the cover plate 25. Moreover, in some embodiments, the bottom surface of the adsorbent 70 may be coated with an adhesive material for adhesively bonding to the exterior surface of the enclosure 15.

Figure 2:
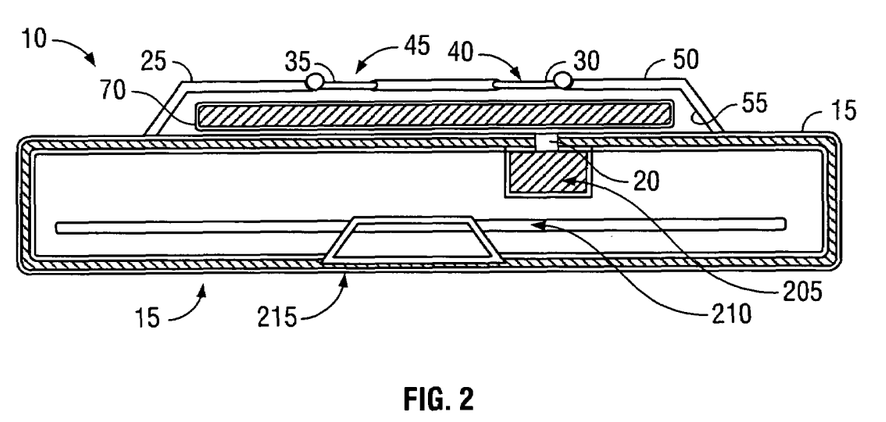
FIG. 2 is a cross-sectional view of an embodiment.

In FIG. 2, the enclosure 15 includes an adsorbent breather filter 205 that encompasses the interior opening of the breather port 20. The cover plate assembly 10 is sealably attached to the enclosure 15 and encompasses the exterior opening of the breather port 20. In this configuration, the cover plate assembly 10 may reduce the amount of atmospheric gasses that pass through the adsorbent breather filter 205. As such, the exposure to contamination of the components, such as disk 210, may be reduced. In one example, the reduced rate of contamination results from the breather valves 30, 35 operating to exchange gasses only when the differential pressure falls outside of a predetermined range. Accordingly, the reduced contamination may improve performance and extend the service life of the disk 210. In some cases, these improvements may be substantial.

In one embodiment, an adsorbent breather filter 205 filters atmospheric gasses entering the sealed enclosure through the breather valve 35. By reducing the amount of contaminants the breather filter 205 is exposed to, the pressure control system may extend the service life of the adsorbent breather filter 205.

Figure 3A:
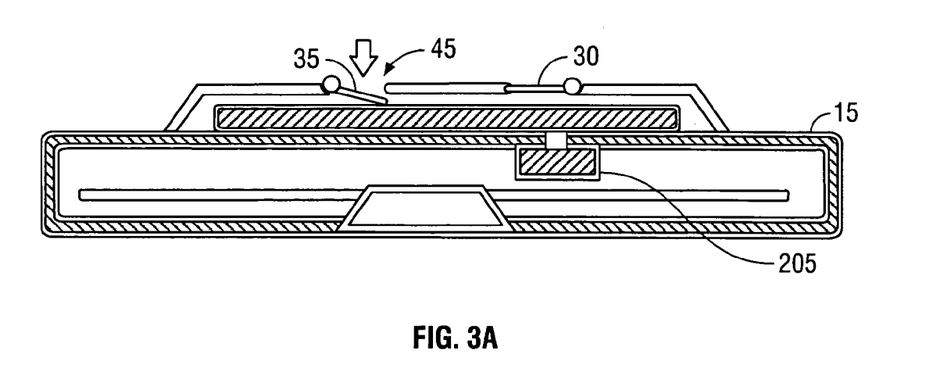
FIGS. 3A-3B are schematic representations that illustrate the operation of the embodiment of FIG. 2 under two differential pressure conditions.
Figure 3B:
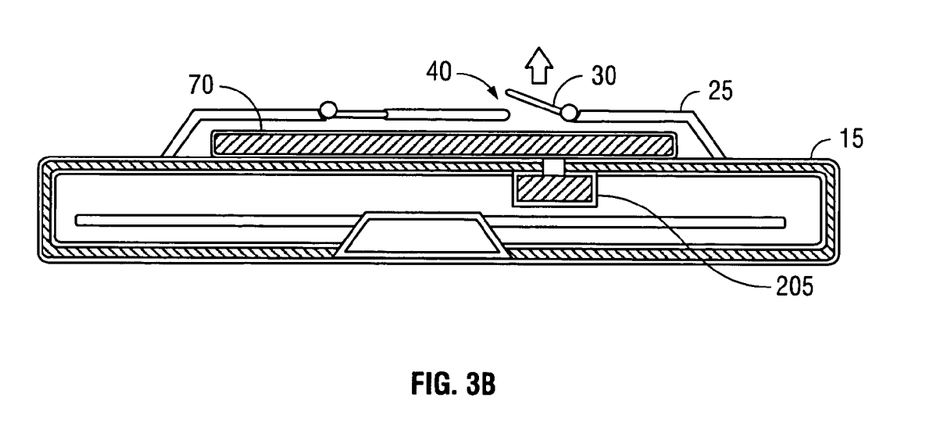

In FIGS. 3A-3B, the operation of the opposing one-way valves is illustrated. In FIG. 3A, the valve 35 opens and responds to a positive differential pressure (indicated by the downward pointing arrow). In this example, the positive differential pressure causes the valve 35 to open, allowing external gasses to pass through the aperture 45. In this manner, the pressure within the sealed enclosure 15 may be approximately equalized with the external atmospheric pressure. When the differential pressure is reduced to a level at which the valve 35 will re-close, then the aperture 45 will again be sealed.

Similarly, in FIG. 3B, the valve 30 operates in response to a negative differential pressure (as indicated by the upward pointing arrow). In this example, the valve 30 opens to allow internal gasses to vent out through the aperture 40. When the pressure within the sealed enclosure 15 drops to a level at which the valve 30 may re-close, then the valve 30 will close and seal the aperture 40.

Figure 4:
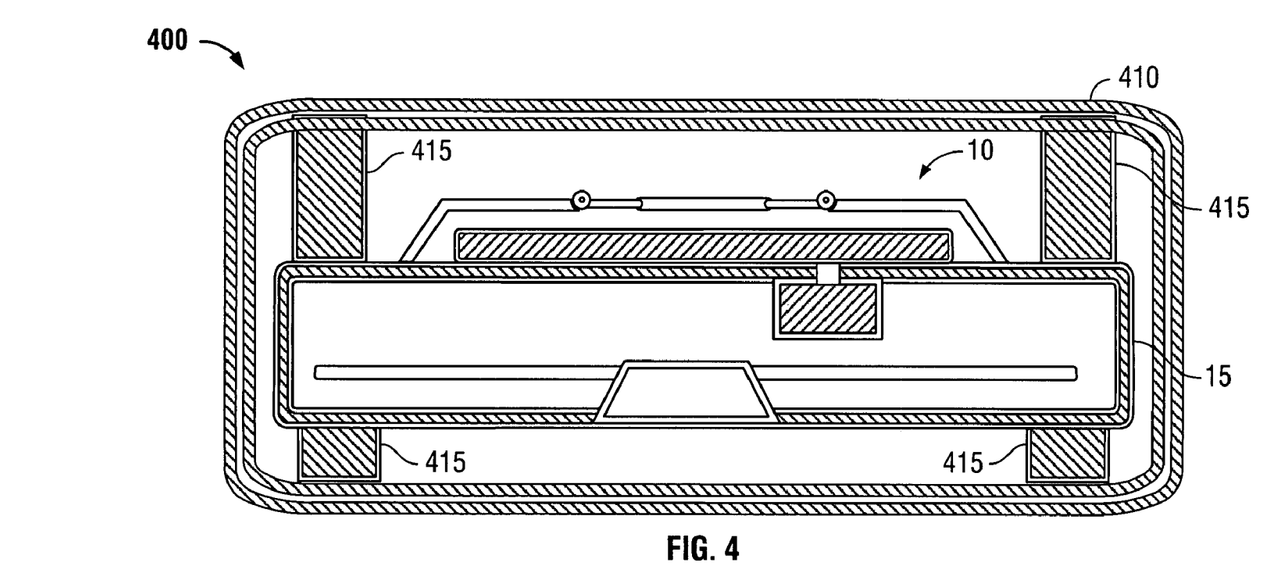
FIG. 4 is a cross-sectional view of an embodiment that includes an enclosure housed within a second enclosure.

An exemplary embodiment of the above-described enclosure 15 with a sealably attached cover plate assembly 10 is illustrated in an exemplary system 400 in FIG. 4. In this application, the system 400 includes an outer enclosure 410 that contains the enclosure 15 and the attached cover plate assembly 10. In embodiments, the outer enclosure 410 need not be sealed, and may optionally include vents or other apertures. The enclosure 15 is mounted within the outer enclosure 410 by a set of shock absorbers 415. In alternative embodiments, the enclosure 15 may be held in place within the outer enclosure 410 by various known methods which may include, but are not limited to, stand-offs, fasteners, adhesives, shelf features, friction fit, packing material, or other suitable method.

In embodiments, the system 400 may provide advantages that may include, for example, the ability to change the form factor of an enclosure that already incorporates the advantages associated with the pressure-controlled system for sealed enclosures, as described herein. For example, in one embodiment, the outer enclosure 410 may be a cartridge that is sized to fit in a standard receptacle, and may further provide an interface for coupling electrical signals between an external device and the enclosure 15. When assembled as a system 400, the cover plate assembly 10 may substantially protect the apparatus within the enclosure 15 from humidity and/or contamination that may be present within the outer enclosure 410. This may, for example, reduce the costs associated with designing a new product package to match a particular form factor.

Figure 5:
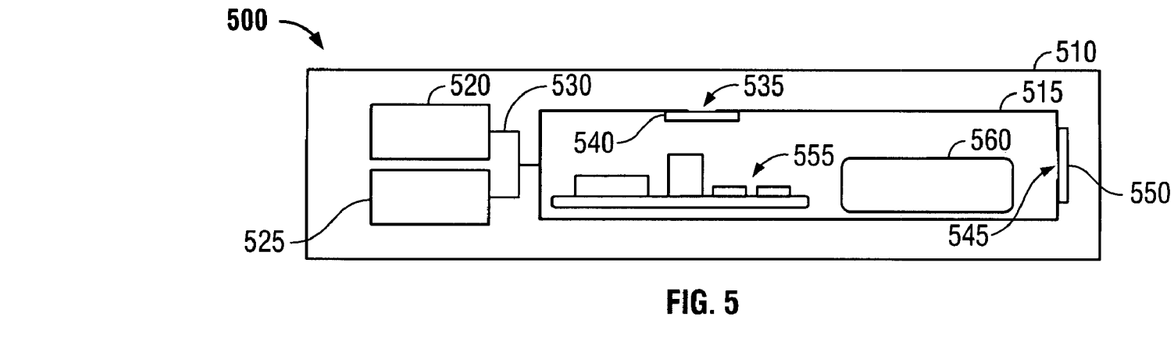
FIG. 5 is a cross-sectional view of an embodiment that includes a sub-system of an exemplary system.

In FIG. 5, an exemplary system 500 includes a housing 510 that contains sub-systems 515, 520, 525, which are connected by a coupling network 530. At least sub-system 515 is an enclosure that includes an aperture 535 encompassed by a one-way valve 540, and an aperture 545 encompassed by a one-way valve 550. The enclosure 515 contains an apparatus 555 and an element 560.

The apertures 535, 545 in the enclosure 515 are encompassed by opposing one-way valves, respectively. In this example, the valve 540 is mounted to an interior surface of the enclosure 515 to permit the pressure to equalize when the internal pressure falls below the ambient pressure in the enclosure 510 by at least a predetermined pressure. Similarly, the valve 550 is mounted to an exterior surface of the enclosure to permit the pressure to equalize when the internal pressure rises above the ambient pressure in the enclosure 510 by at least a predetermined pressure.

In the embodiment illustrated in FIG. 5, opposing one-way valves 540, 550 are integrated directly into the enclosure 515 to sealably encompass the apertures 535, 545. As such, no cover plate is required. Moreover, the apertures 535, 545 may be located at any suitable region on the enclosure 515. Accordingly, the location of the breather ports may be advantageously selected to minimize contamination, for example, by locating the valve 535 (inlet) away from anticipated sources of contamination, such as certain components on printed circuit boards.

The apparatus 555 may be, for example, an electronic device that performs operations and includes a printed circuit board and operating components. The operations performed by the apparatus 555 may include, for example, operating a server, a network, a computer, a device, or a data storage device. The apparatus 540 may be operably connected to one or more other devices, such as to sub-systems 520, 525 via the network 530. The sub-systems 520, 525 may be, for example, different subsystems in a computing system that are operably connected via the network 530. The network 530 may include a parallel and/or serial data communication protocols, and may include wired or wireless path connections between connected devices.

The element 560 may be, for example, an environmental control module or element, which may include any or all of a desiccant, adsorbent, filter, or other chemical and/or mechanical filter system, as described elsewhere herein.

Figure 6A:
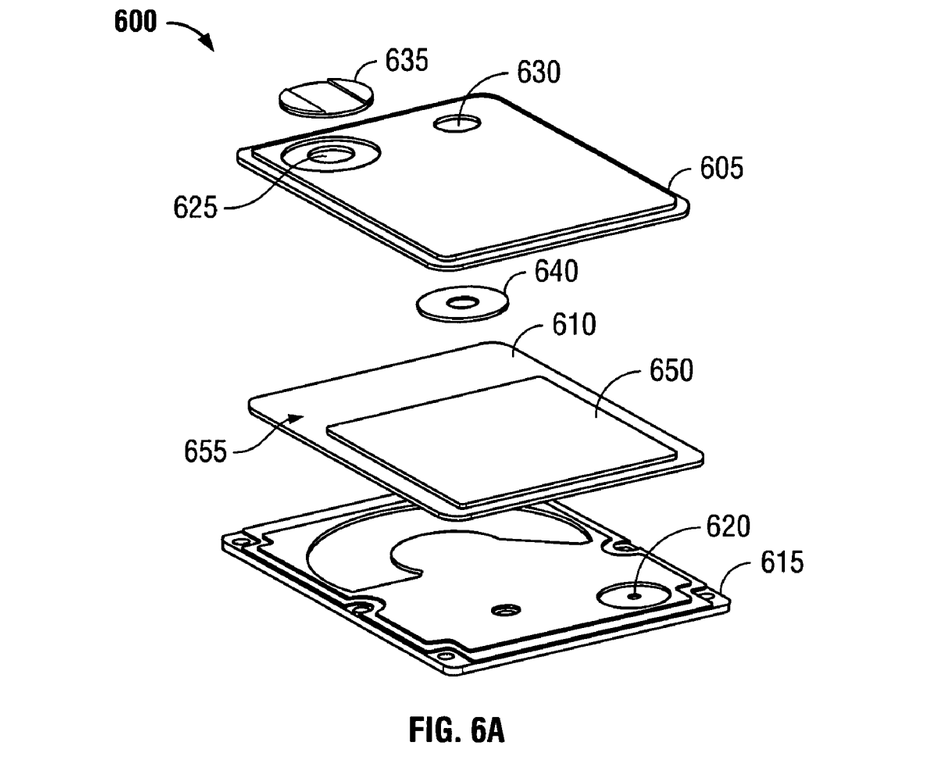
FIGS. 6A-6B are exploded and assembled views, respectively, of an exemplary sub-assembly.
Figure 6B:
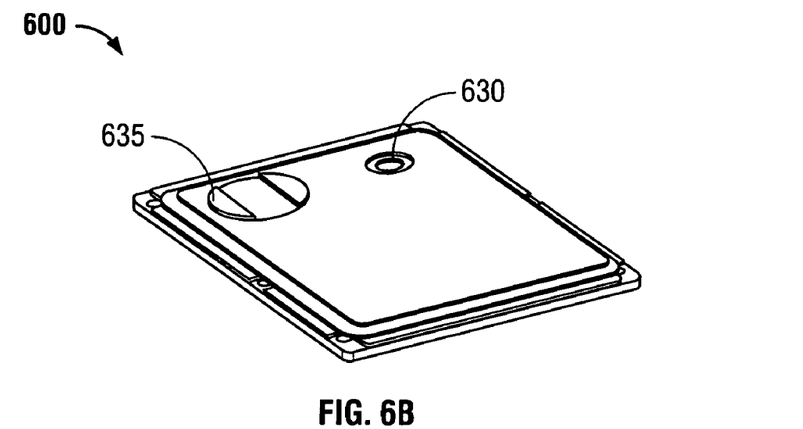

In FIGS. 6A-6B, an exemplary sub-assembly 600 is shown. The sub-assembly 600 may be separately provided to sealably encompass a breather port or other aperture or apertures when attached to a suitable enclosure. In some applications, the sub-assembly 600 may provide a humidity control function or other environmental control function in an enclosure.

The sub-assembly 600 may be sealably attached to a suitable enclosure to reduce contamination or to substantially inhibit the passing of substances through the breather port or aperture while the differential pressure is within predetermined limits. For purposes of illustration, the sub-assembly 600 is illustrated as being arranged to sealably encompass an aperture 620 in a top cover 615 of an enclosure.

In a first exemplary embodiment, the sub-assembly 600 includes at least a cover 605 and a pair of one-way valves 635, 640. The cover 605 is substantially rigid to provide structural integrity and protection for other internal components, and includes at least two apertures 625, 630. One-way valves 635, 640 are installed to sealably encompass the apertures 625, 630, respectively. As has previously been described, one-way valves 635, 640 may be assembled in opposition to limit the differential pressure between the interior and exterior of a sealed enclosure.

In a second exemplary embodiment, the sub-assembly 600 further includes an optional environmental control module 655. As described above, the environmental control module 655 may include mechanical or chemical filters, for example, that may provide enhanced protection against contamination. In this example, the environmental control module 655 includes an adhesive layer 610 and a desiccant 650. In addition to or instead of the desiccant 650, some embodiments may include one or more filters as described elsewhere herein. In some embodiments, the desiccant 650 may be disposed within a single or multiple portions of the cover 605, and may further be mechanically or adhesively contained within the cover 605. In this example, the desiccant 650 encompasses the aperture 620, but does not contact or interfere with either apertures 625, 630 or valves 635, 640.

In the example illustrated in FIGS. 6A-6B, a peripheral region of the top surface of the adhesive layer 610 is also attached to a corresponding region on the cover 605, and the bottom surface of the adhesive layer 610 is configured for attachment to a surface of an enclosure. To provide for fluid communication between the interior region of the cover 605 and the interior region of the enclosure, the adhesive layer 610 may either be permeable or partially removed (not shown) from around the breather port 620.

In a third exemplary embodiment, the sub-assembly 600 further includes the top cover 615 of an enclosure. When the top cover 615 is assembled with the cover 605, the valves 635, 640, and the environmental control module 655, the subassembly 600 may be sealably attached to the enclosure. In an alternative embodiment, the sub-assembly 600 includes the cover 605, the valves 635, 640, and the top cover 615 (without the environmental control module).

FIG. 6B illustrates, in one embodiment, the sub-assembly 600 that may be sealably attached to any suitable enclosure, as described above. The opposing one-way valves 635, 640 are operable to limit the differential pressure between the interior region and the exterior region to within a predetermined range. In various embodiments, the sub-assembly 600 may be sealably attached to an enclosure using methods that may include, but are not limited to, welding, fasteners, or adhesives. Some embodiments may include the use of gaskets or other method to substantially seal the sub-assembly 600 to an enclosure.

In various embodiments, a pressure control system may be applied to provide for hermetically sealing an enclosure, or to provide for substantially inhibiting the ingress or egress of substances, including atmospheric gasses and contaminants, such as water vapor, smog, dust, and various other substances, when the differential pressure is within predetermined limits. Embodiments of the pressure control system may include opposing one-way breather valves that effectively seal an enclosure against the ingress or egress of the aforementioned substances.

In embodiments, one or more devices that contain the pressure control system may be included in any of the following, either individually or in combination: a computer, a data storage device, a recording or playback device, a mainframe computer, a server, an enterprise computing system, an industrial controller, such as a programmable logic controller, or other processor-based or electronic system. Other embodiments may include an apparatus that includes electronic, electromechanical, mechanical, biological, or material components that are housed in an enclosure that may be sealed.

A number of examples have been described. Nevertheless, it will be understood that various modifications may be made without departing from the spirit and scope of the invention. For example, various adsorbents, including desiccants, activated carbon, and environmental control modules, may be incorporated into the enclosure to cooperate with the breather valves described herein. These elements, alone or in combination, may be used to control the pressure and contamination level of the atmosphere within a sealed enclosure. In another example, the pressure of the breather valves need not be set to the same threshold. If the sensitivity of the enclosure to expansion forces is greater than the sensitivity to crush forces, then the breather valve that allows internal pressure to vent out may be set to a lower threshold level than the opposing inlet breather valve.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application to an enclosure without departing from the spirit and scope of the present invention.

What is claimed is:

1. A cover assembly, comprising:
   a cover plate having a first aperture and a second aperture, each aperture providing fluid communication between a first region and a second region;
   a first one-way valve sealably encompassing the first aperture and oriented to permit atmospheric gasses to pass through the first aperture from the first region to the second region in response to pressure in the first region exceeding the pressure in the second region by at least a first predetermined threshold; and
   a second one-way valve sealably encompassing the second aperture and oriented to permit atmospheric gasses to pass through the second aperture from the second region to the first region in response to pressure in the second region exceeding the pressure in the first region by at least a second predetermined threshold.

2. The cover assembly of claim 1, wherein the first and second one-way valves each comprise a first and a second substrate layer lying in substantially parallel planes, and a liquid film, disposed substantially between the substrate layers, the second substrate layer including an aperture, wherein atmospheric gasses pass through the first aperture in the cover plate, through the aperture in the first one-way valve, and between the first and second substrate layers of the first valve in response to pressure in the first region exceeding the pressure in the second region by at least the first predetermined threshold, and atmospheric gasses pass through the second aperture in the cover plate, through the aperture in the second one-way valve, and between the first and second substrate layers of the second valve in response to pressure in the second region exceeding the pressure in the first region by at least the second predetermined threshold.

3. The cover assembly of claim 1, wherein the first one-way valve is bonded to an exterior surface of the cover plate, and the second one-way valve is bonded to an interior surface of the cover plate.

4. The cover assembly of claim 1, further comprising an adhesive layer configured to adhesively bond the cover plate to an enclosure to sealably encompass an aperture in the enclosure wall.

5. The cover assembly of claim 1, further comprising a filter.

6. The cover assembly of claim 5, wherein the filter comprises an adsorbent module.

7. The cover assembly of claim 5, wherein the filter comprises at least one element selected from the group consisting of: carbon, activated carbon, silica gel, molecular sieves, and potassium carbonate.

8. A processor-based system comprising the cover assembly of claim 2.

9. The processor-based system of claim 8, wherein the processor-based system comprises a data storage device.

10. An enclosure, comprising:
a plurality of walls defining a interior region and an exterior region, the plurality of walls including a first aperture and a second aperture, each aperture providing fluid communication between the interior region and the exterior region;
a first one-way valve sealably encompassing the first aperture and oriented to permit atmospheric gasses to pass through the first aperture from the interior region to the exterior region in response to pressure in the interior region exceeding the pressure in the exterior region by at least a first predetermined threshold; and
a second one-way valve sealably encompassing the second aperture and oriented to permit atmospheric gasses to pass through the second aperture from the exterior region to the interior region in response to pressure in the exterior region exceeding the pressure in the interior region by at least a second predetermined threshold.

11. The enclosure of claim 10, wherein the first and second one-way valves each comprise a first and a second substrate layer lying in substantially parallel planes, and a liquid film disposed substantially between the substrate layers, the second substrate layer including an aperture, wherein atmospheric gasses pass through the first aperture in the cover plate, through the aperture in the first one-way valve, and between the first and second substrate layers of the first valve in response to pressure in the interior region exceeding the pressure in the exterior region by at least the first predetermined threshold, and atmospheric gasses pass through the second aperture in the cover plate, through the aperture in the second one-way valve, and between the first and second substrate layers of the second valve in response to pressure in the exterior region exceeding the pressure in the interior region by at least the second predetermined threshold.

12. The enclosure of claim 10, wherein the first one-way valve is bonded to an exterior surface of the enclosure, and the second one-way valve is bonded to an interior surface of the enclosure.

13. The enclosure of claim 10, further comprising a filter disposed in the interior region.

14. The enclosure of claim 13, wherein the filter comprises at least one element selected from the group consisting of: carbon, activated carbon, silica gel, molecular sieves, and potassium carbonate.

15. The enclosure of claim 13, wherein the filter comprises an adsorbent module.

16. The enclosure of claim 15, further comprising an adsorbent breather filter that encompasses one of the first and the second apertures in the enclosure.

17. An assembly comprising a housing that defines a cavity that contains the enclosure of claim 10.

18. The assembly of claim 17, further comprising at least one shock-absorbing element disposed within the cavity and between the enclosure and the housing.

19. A method of controlling the differential pressure between an interior region and an exterior region of a sealed enclosure, the method comprising:
providing an enclosure including a first aperture and a second aperture, each aperture providing fluid communication between an interior region of the enclosure and an exterior region of the enclosure;
sealably encompassing the first aperture with a first one-way valve oriented to permit atmospheric gasses to pass through the first aperture from the interior region to the exterior region in response to pressure in the interior region exceeding the pressure in the exterior region by at least a first predetermined threshold; and
sealably encompassing the second aperture with a second one-way valve oriented to permit atmospheric gasses to pass through the second aperture from the exterior region to the interior region in response to pressure in the exterior region exceeding the pressure in the interior region by at least a second predetermined threshold.

20. The method of claim 19, wherein the first and second one-way valves each comprise a first and a second substrate layers lying in substantially parallel planes, and a liquid film disposed substantially between the substrate layers, the second substrate layer including an aperture, wherein atmospheric gasses pass through the first aperture in the enclosure, through the aperture in the first one-way valve, and between the first and second substrate layers of the first valve in response to pressure in the interior region exceeding the pressure in the exterior region by at least the first predetermined threshold, and atmospheric gasses pass through the second aperture in the enclosure, through the aperture in the second one-way valve, and between the first and second substrate layers of the second valve in response to pressure in the exterior region exceeding the pressure in the interior region by at least the second predetermined threshold.

21. The method of claim 19, wherein the first predetermined threshold is less than the second predetermined threshold.

22. The method of claim 19, wherein the first predetermined threshold is different from the second predetermined threshold.

23. The method of claim 19, wherein sealably encompassing the first aperture with a first one-way valve comprises bonding the first one-way valve to an exterior surface of the enclosure.

24. The method of claim 23, wherein sealably encompassing the second aperture with a second one-way valve comprises bonding the second one-way valve to an interior surface of the enclosure.

25. The method of claim 19, further comprising providing a filter in the interior region of the enclosure.

26. The method of claim 25, wherein the provided filter comprises an adsorbent module.

27. The method of claim 25, wherein the provided filter comprises at least one element selected from the group consisting of: carbon, activated carbon, silica gel, molecular sieves, and potassium carbonate.

28. The method of claim 19, further comprising:

providing a housing; and installing the enclosure inside the housing.

29. The method of claim 19, further comprising providing a filter in the interior region of the enclosure.

* * * * *